US008670546B2

(12) United States Patent
Wohlert

(10) Patent No.: US 8,670,546 B2
(45) Date of Patent: Mar. 11, 2014

(54) SYSTEMS AND METHODS FOR PROVIDING A PERSONALIZED COMMUNICATION PROCESSING SERVICE

(75) Inventor: Randolph Wohlert, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1214 days.

(21) Appl. No.: 12/255,709

(22) Filed: Oct. 22, 2008

(65) Prior Publication Data

US 2010/0098231 A1  Apr. 22, 2010

(51) Int. Cl.
*H04M 7/00* (2006.01)

(52) U.S. Cl.
USPC .................................. 379/221.01; 379/211.01

(58) Field of Classification Search
USPC ............. 379/207.15, 211.02, 212.01, 221.01, 379/272, 273; 455/445
See application file for complete search history.

(56) References Cited

U.S. PATENT DOCUMENTS

| | | | |
|---|---|---|---|
| 5,937,345 A * | 8/1999 | McGowan et al. | 455/410 |
| 6,058,178 A * | 5/2000 | McKendry et al. | 379/212.01 |
| 6,418,211 B1 * | 7/2002 | Irvin | 379/188 |
| 6,771,947 B1 * | 8/2004 | Griffiths | 455/404.1 |
| 6,856,598 B1 * | 2/2005 | Stanfield | 370/235 |
| 7,512,090 B2 * | 3/2009 | Benitez Pelaez et al. | 370/328 |
| 7,925,688 B2 * | 4/2011 | Mampaey et al. | 709/200 |
| 2004/0028208 A1 * | 2/2004 | Carnazza et al. | 379/221.01 |
| 2006/0256948 A1 * | 11/2006 | Crockett et al. | 379/220.01 |
| 2009/0310768 A1 * | 12/2009 | Hansen et al. | 379/201.02 |
| 2010/0098234 A1 * | 4/2010 | Ku et al. | 379/210.02 |

* cited by examiner

*Primary Examiner* — Oleg Asanbayev
(74) *Attorney, Agent, or Firm* — Parks IP Law LLC; Mickki D. Murray, Esq.

(57) ABSTRACT

Systems and methods for providing a personalized communication processing service are disclosed. In one embodiment, a personalized communication processing system (PCPS) can include a processor, an input/output interface, and a memory. The memory can be configured to store instructions, executable by the processor to intercept an incoming communication from a calling party, identify calling party information, determine a contact category to which the calling party is logically associated based upon a recognized relationship between the called party and the calling party as defined in the contact category, determine a user state of the called party that identifies conditions under which a communication processing treatment is to be provided for the contact category according to a personalized communication processing rule, apply the rule associated with the determined user state and the determined contact category, and process the incoming communication according to the applied personalized processing rule.

13 Claims, 9 Drawing Sheets

SYSTEMS AND METHODS FOR PROVIDING A PERSONALIZED COMMUNICATION PROCESSING SERVICE

TECHNICAL FIELD

The present disclosure relates generally to communications and, more particularly, to systems and methods for providing a personalized communication processing service.

BACKGROUND

Technological progress has enabled the cost effective development and deployment of increasingly powerful applications and services. Some wireless networks provide users with location based services (LBS). LBS's can use the location, or approximate location, of a wireless device to provide services to a user. Network operators can also use location information in analysis of infrastructure, usage patterns, and the like. For example, some wireless devices now include global positioning system (GPS) capability for determining the location of the wireless device for navigation, emergency, or other purposes. Some devices include other systems and methods for determining the location of the device such as, but not limited to, triangulation using cellular network and/or WiFi resources, assisted GPS, satellite links, and the like.

Presence applications allow a user to share his or her availability with others. Device clients, such as instant messaging clients, provide options for a user to select their presence status (i.e., available, unavailable, away, idle, etc.). These clients are used primarily for fixed access devices, such as computers. In recent years, however, advances in wireless device technology have enabled wireless devices to run complex application, such as instant messaging clients.

Calendar applications allow users to keep track of daily activities, events, meetings, and appointments. Synchronization technologies allow multiple devices, both fixed and wireless, to be synchronized such that calendar entries that are added, deleted, or otherwise changed on one device are reflected on each device for which the user has a synchronized calendar. Mobile email applications and address book applications are often combined with calendar functionality, and similar synchronization technologies are used to synchronize email and address book entries.

The sophistication of wireless devices, wireless networks, and wireless device users are making some sophisticated device capabilities more commonplace. As the number of users employing location, presence, calendar, email, and address book applications and corresponding services rises, the network and device infrastructure needed to support these services may need to be improved to provide an enjoyable customer experience.

SUMMARY

The present disclosure describes various systems and methods for providing a personalized communication processing service. In one exemplary embodiment of the present disclosure, a method for operating a personalized communication processing system (PCPS) to provide a personalized communication processing service can include intercepting an incoming communication from a calling party, identifying calling party information if available, determining one or more contact categories to which the calling party is logically associated based upon a recognized relationship between the called party and the calling party as defined in the contact category, determining a user state of the called party that identifies conditions under which a communication processing treatment is to be provided for the contact category according to one or more personalized communication processing rules, applying the one or more rules associated with the determined user state and the determined contact category, and processing the incoming communication according to the applied personalized processing rule.

In some embodiments, intercepting the incoming communication from the calling party can include intercepting a voice call, a text message, a multimedia message, an email message, a video message, a video call, an instant message, a chat request, a video share request, combinations thereof, and the like.

In some embodiments, the method can further include determining that no calling party information is available and processing the incoming communication according to a default rule.

In some embodiments, processing the incoming communication according to the applied personalized processing rule can include one or more of processing the incoming communication to route the incoming communication to voicemail, providing response options to the calling party, providing the called party with a personalized notification based upon the calling party, placing the calling party on hold, routing the incoming communication to another destination, and performing alternative communications with the called party, according to the applied personalized processing rule.

In some embodiments, the method can further include acquiring enabler information from one or more enabler sources, the enabler information can include presence information, location information, calendar information, address book information, combinations thereof, and the like.

In some embodiments, intercepting the incoming communication from the calling party can include intercepting the incoming communication at a mobile switching center. In other embodiments, intercepting the incoming communication from the calling party can include intercepting the incoming communication at a call session control function.

In another exemplary embodiment of the present disclosure, a PCPS configured to provide a personalized communication processing service can include a processor, an input/output interface, and a memory that is in communication with the processor and the input/output interface. The memory can be configured to store instructions, executable by the processor to receive an incoming communication from a calling party, identify calling party information if available, determine one or more contact categories to which the calling party is logically associated based upon a recognized relationship between the called party and the calling party as defined in the contact category, determine a user state of the called party that identifies conditions under which a communication processing treatment is to be provided for the contact category according to one or more personalized communication processing rules, apply the rule associated with the determined user state and the determined contact category, and process the incoming communication according to the applied personalized processing rule.

In some embodiments, the PCPS is a network element. In other embodiments, the PCPS is logically associated with a mobile switching center. In other embodiments, the PCPS is logically associated with a call session control function. In some embodiments, the PCPS is resident on a mobile device.

In another exemplary embodiment of the present disclosure, a computer readable medium can include computer readable instructions that, when executed, perform the steps of intercepting an incoming communication from a calling party, identifying calling party information if available, determining one or more contact categories to which the calling party is logically associated based upon a recognized relationship between the called party and the calling party as defined in the contact category, determining a user state of the called party that identifies conditions under which a communication processing treatment is to be provided for the contact category according to one or more personalized communication processing rules, applying the rule associated with the determined user state and the determined contact category, and processing the incoming communication according to the applied personalized processing rule.

Other exemplary embodiments of the present disclosure are disclosed herein.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

As used herein, the person receiving an incoming communication is referred to as a "user" or a "called party" and those who contact the user are referred to as the "calling party." It should be understood, however, that the terms "calling party" and "called party" are not intended to limit the scope of incoming communications to merely incoming calls, rather all incoming communications, for example, messages, data, and voice are all intended to be included in the scope of these terms.

Figure 1:
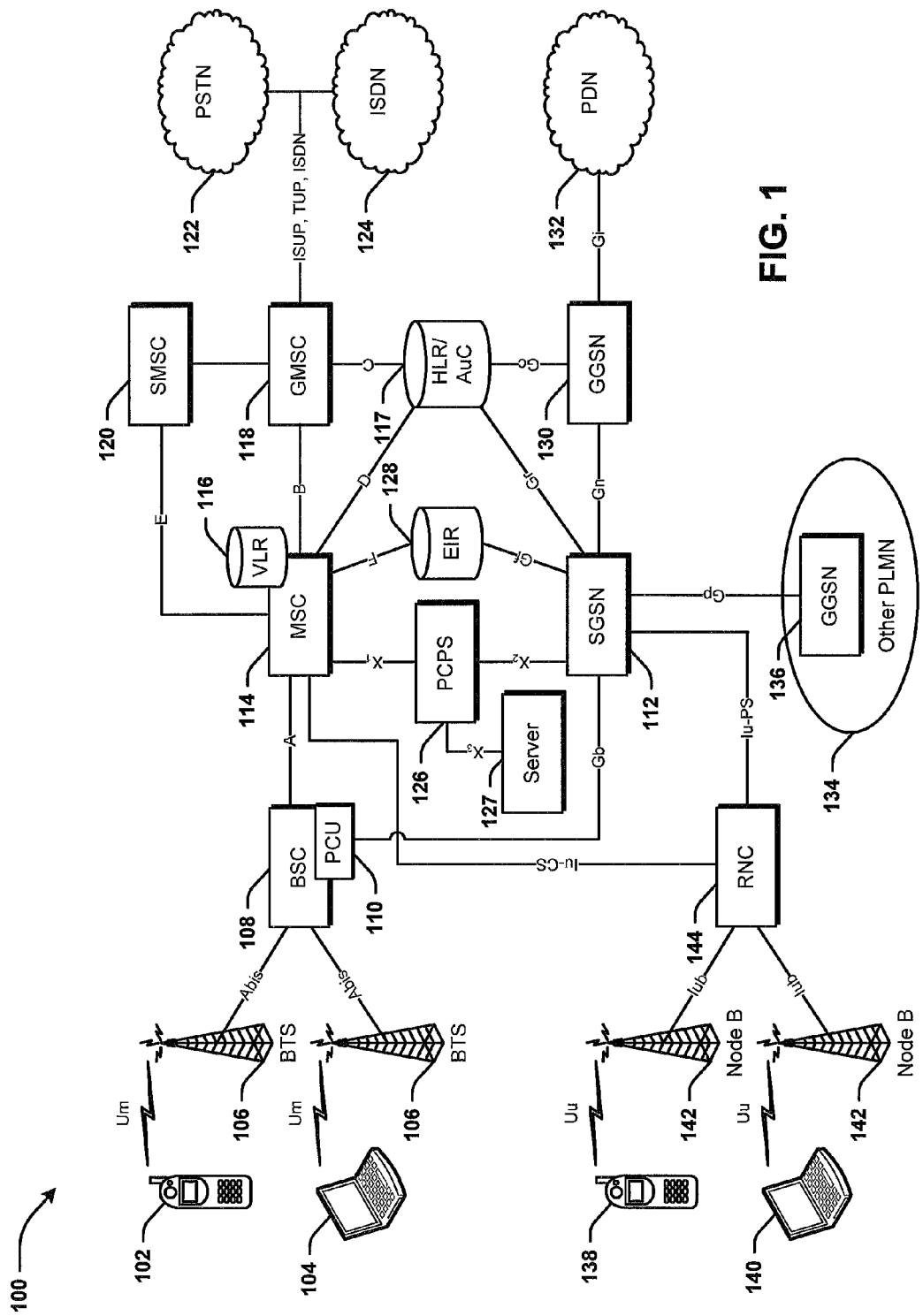
FIG. 1 illustrates an exemplary wireless telecommunications network in which the present disclosure can be implemented.

Referring now to the drawings, wherein like numerals represent like elements throughout the several views, FIG. 1 illustrates an exemplary wireless telecommunications network 100 in which the present disclosure can be implemented. The network elements and network interfaces illustrated in the wireless telecommunications network 100 are described for Global System for Mobile communications (GSM), General Packet Radio Service (GPRS), and Universal Mobile Telecommunications System (UMTS) telecommunications technologies. It should be understood, however, that the present disclosure is applicable to any existing or yet to be developed telecommunications technology. Some examples of other suitable telecommunications technologies include networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G and 3G (third generation) and above (4G and beyond) technologies. Examples of suitable data enabling bearers include GPRS, Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data enabling bearers.

The illustrated wireless telecommunications network 100 includes two radio access networks (RAN). A first RAN, illustrated in the upper left hand portion of FIG. 1, is dedicated to GSM-based network access. A second RAN, illustrated in the lower left hand portion of FIG. 1, is dedicated to UMTS-based network access. The present disclosure is not limited to the illustrated embodiments for GSM and UMTS network access. Other access technologies are contemplated as described above. The first RAN is described first immediately below.

The illustrated wireless telecommunications network 100 includes a first mobile station (MS) 102 and a second MS 104 that are each in communication with a base transceiver station (BTS) 106 via the Um radio (air) interface. A BTS 106 is the terminating node for the radio interface in the first RAN. Each BTS 106 can include one or more transceivers and can be responsible for ciphering of the radio interface.

In the illustrated embodiment, the first MS 102 is a mobile phone and the second MS 104 is a portable computer, such as a laptop with an integrated or external, removable GSM access card. Each MS 102, 104 can include mobile equipment, such as, but not limited to, keyboards, screens, touch screens, radio transceivers, circuit boards, processors, memory, etc., and a subscriber identity module (SIM) that contains subscriber information to enable network access to the wireless telecommunications network 100.

Each BTS 106 is in communication with a base station controller (BSC) 108 via the Abis interface. The BSC 108 is configured to allocate radio resources to the MS's 102, 104, administer frequencies, and control handovers between BTS's 106 (and others not shown). Although illustrated as a distinct element, the BSC 108 functions can be incorporated in the BTS 106 and the Abis interface can be eliminated.

The BSC 108 can be logically associated with a packet control unit (PCU) 110 when GPRS capabilities are employed, such as in the illustrated wireless telecommunications network 100. The PCU 110 is configured to support radio related aspects of GPRS when connected to a GSM network. The PCU 110 is in communication with a serving GPRS support node (SGSN) 112 via the Gb interface. The SGSN 112 records and tracks the location of each mobile device (e.g., MS's 102, 104) in the wireless telecommunications network 100. The SGSN 112 also provides security functions and access control functions.

The BSC 108 is in communication with a mobile switching center (MSC) 114 via an A interface. The MSC 114 is configured to function as a telecommunications switch and is in communication with location databases, such a visiting location register (VLR) 116 and a home location register (HLR) 117. The VLR 116 can be logically associated with the MSC 114 as illustrated or can be separate from the MSC 114. The VLR 116 is a database configured to store all subscriber data that is required for call processing and mobility management for mobile subscribers that are currently located in an area controlled by the VLR 116. The HLR 117 is in communication with the MSC 114 and VLR 116 via the D interface. The HLR 117 is a database configured to provide routing information for mobile terminated (MT) calls and short message service (SMS) messages. The HLR 117 is also configured to maintain subscriber data that is distributed to the relevant VLR (e.g., the VLR 116) or the SGSN 112 through the attach process and mobility management procedures, such as location area and routing area updates. The HLR 117 can be logically associated with an authentication center (AuC). The AuC is configured to authenticate each SIM card that attempts to connect to the wireless telecommunications network 100, for example, when a mobile device is powered on. Once authenticated, the HLR 117 is allowed to manage the SIM and services provided to the MS 102, 104. The AuC can generate an encryption key that is used to encrypt all wireless communications between the MS 102, 104 and the wireless telecommunications network 100.

The MSC 114 is also in communication with a gateway-MSC (GMSC) 118 and a short message service center (SMSC) 120 via the B interface and the E interface, respectively. The GMSC 118 is configured to provide an edge function within a public land mobile network (PLMN). The GMSC 118 terminates signaling and traffic from the public switched telephone network (PSTN) 122 and integrated service digital network (ISDN) 124 and converts the signaling and traffic to protocols employed by the mobile network. The GMSC 118 is in communication with the HLR/AuC 117 via the C interface to obtain routing information for mobile terminated calls originating from fixed network devices, such as fixed telephones that are in communication with the mobile network via the PSTN 122, for example. The SMSC 120 is configured to store SMS messages and forward SMS messages to the indicated subscriber number.

Figure 2:
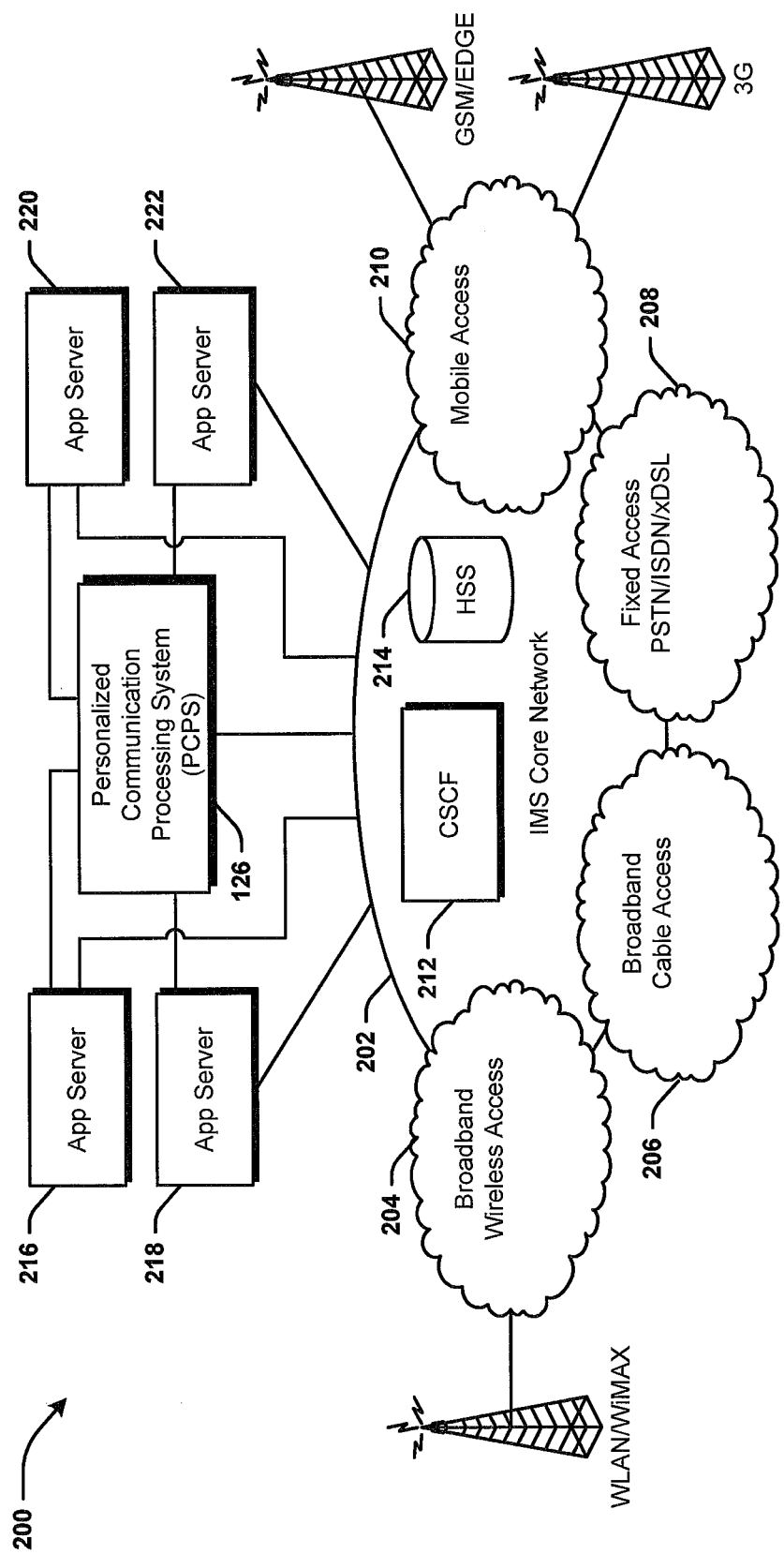
FIG. 2 illustrates an exemplary Internet protocol Multimedia Subsystem (IMS) network in which the present disclosure can be implemented
Figure 3:
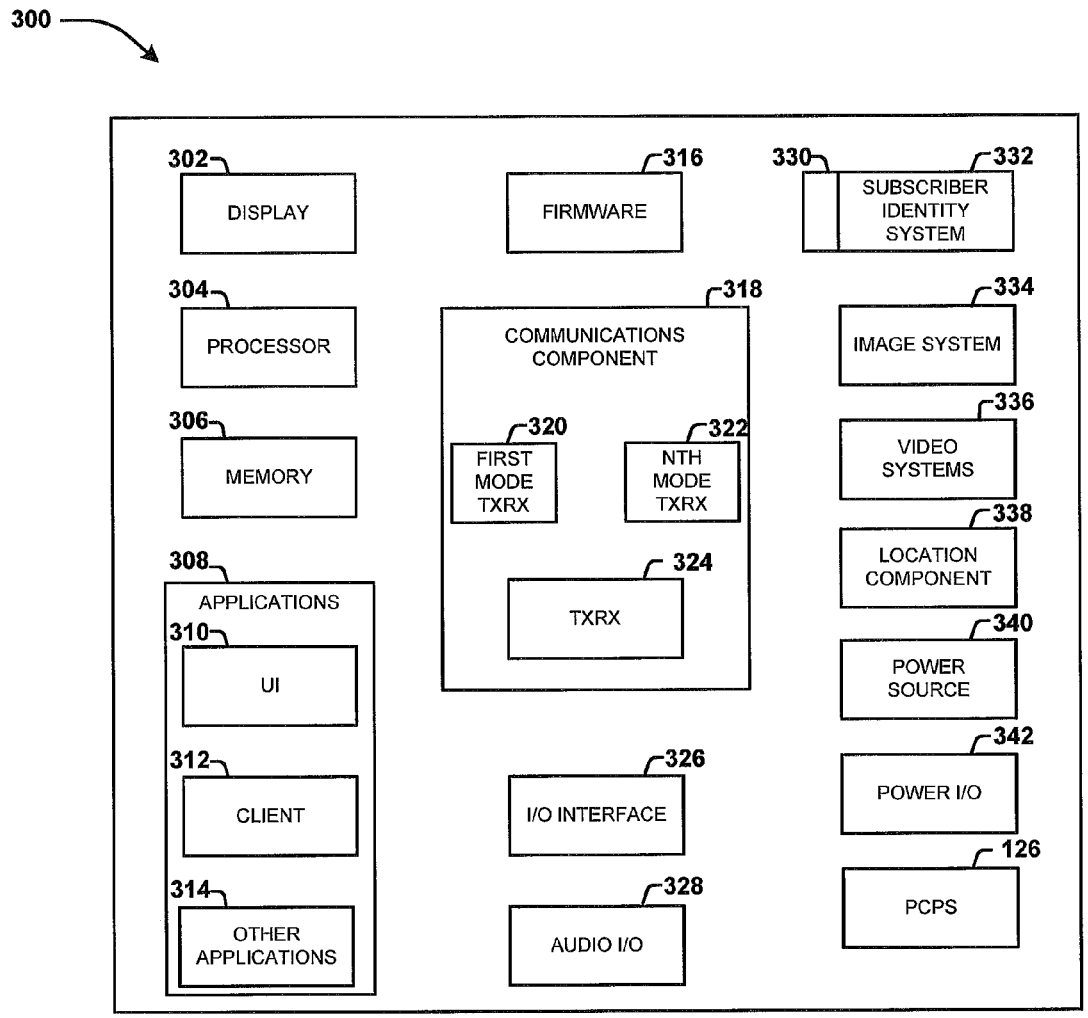
FIG. 3 illustrates a mobile device and components thereof, according to an exemplary embodiment of the present disclosure.

The MSC 114 is also in communication with a personalized communication processing system (PCPS) 126 via an exemplary $X_1$ interface. In the illustrated embodiment, the PCPS 126 is a network element in the wireless telecommunications network 100. In an alternative embodiment, the PCPS 126 is a network element in communication with an Internet protocol Multimedia Subsystem (IMS) network, as illustrated in FIG. 2. In another alternative embodiment, the PCPS 126 is hardware, software, or any combination thereof in a mobile device, as illustrated in FIG. 3. Each of these alternative embodiments is described in detail with reference to the corresponding figures. In any embodiment, the PCPS 126 can be hardware, software, or any combination thereof and can be a stand-alone system (as shown) or can be integrated into other systems, servers, network elements, nodes, software, hardware, and the like. For example, the PCPS 126 or functionality thereof can be integrated into the MSC 114. In the illustrated embodiment, the PCPS 126 can be configured to intercept calls, SMS messages and other communications sent to the MSC 114 and process the communication according to personalized communication processing rules that can be set by a user, a network operator, an application provider, a service provider, or other entity, for example. The PCPS 126 is described in greater detail below.

The PCPS 126 can be configured to integrate personalized communication processing rules with information provided from a diverse range of information entities, referred to herein as enablers. An enabler can include, but is not limited to, location enablers, presence enablers, calendar enablers, and contact (address book) enablers. Generally, an enabler provides information that can personalize a communication that is processed by the PCPS 126. An enabler can be an application server, such as the server 127 that is illustrated as being in communication with the PCPS 126 via an $X_3$ interface. The server 127 can provide services, such as, but not limited to, location-based services (LBS), presence-based services (PBS), calendar services, and address book services (e.g., MICROSOFT® Exchange). In an alternative embodiment, an enabler can be a network node that includes processing, storage, and communication functionality to share relevant information with the PCPS 126. In another alternative embodiment, an enabler can be included in a mobile device, such as MS's 102, 104, for example, as an application or other software. Several exemplary enablers are now described.

A location enabler can use, for example, a positioning technology, such as, but not limited to, Global Positioning System (GPS), assisted GPS (A-GPS), WiFi triangulation, cellular triangulation, and other positioning technologies to provide location information to the PCPS 126. Geographic Information Systems (GIS) can provide the tools to provision and administer base map data including streets, highways, interstates, buildings, and terrain data. GIS can also provide point-of-interest (POI) data, such as the location of gas stations, restaurants, hotels, motels, stores, restaurants, rest stops, National Parks, other recreation sites, and the like. GIS can also provide radio frequency characteristic data for mobile networks that can be used to determine the serving BTS of a user. A location enabler can provide positioning data and GIS data to the PCPS 126. The PCPS 126 can use the positioning data and GIS data to further personalize a communication that is intercepted by the PCPS 126.

A presence enabler can provide information to the PCPS 126 to indicate the ability and the willingness of a user to communicate. A presence enabler can provide presence information (e.g., presence state or presentity) to the PCPS 126. The PCPS 126 can use the presence information to further personalize a communication that is intercepted by the PCPS 126.

A calendar enabler can provide calendar information to the PCPS 126 from a calendar account, such as a calendar account associated with a calendar service, a web-based calendar service, a MICROSOFT® Exchange account, a "push" calendar service, a "pull" contact service, or other calendar synchronization service, for example. The PCPS 126 can use the calendar information to further personalize a communication that is intercepted by the PCPS 126.

A contacts (address book) enabler can provide contact information to the PCPS 126 for one or more contacts in a contact account, such as a contact account associated with a contact service, a mobile contact service, a web-based contact service, a MICROSOFT® Exchange account, a "push" contact service, a "pull" contact service, or other contact synchronization service, for example. The PCPS 126 can use the contact information to further personalize a communication that is intercepted by the PCPS 126.

The MSC 114 is also in communication with an equipment identity register (EIR) 128 via an F interface. The EIR 128 is a database that can be configured to identify subscriber devices that are permitted to access the wireless telecommunications network 100. An International Mobile Equipment Identity (IMEI) is a unique identifier that is allocated to each mobile equipment and can be used to identify subscriber devices in the EIR 128. The IMEI includes a type approval code, a final assembly code, a serial number, and a spare digit. An IMEI is typically placed in the EIR 128 once its operation has been certified for the infrastructure in a laboratory or validation facility.

The PCPS 126, the EIR 128, and the HLR/AuC 117 are each in communication with the SGSN 112 via an exemplary $X_2$ interface, the Gf interface, and the Gr interface, respectively. The SGSN 112, in turn, is in communication with a gateway GPRS support node (GGSN) 130 via the Gn interface. The GGSN 130 is configured to provide an edge routing function within a GPRS network to external packet data networks (PDN) 132, such as the Internet and intranets, for example. The GGSN 130 is in communication with the PDN 132 via the Gi interface. The GGSN 130 can include firewall and filtering functionality. The HLR/AuC 117 can be in communication with the GGSN 130 via the Gc interface.

The SGSN 112 is also in communication with another PLMN 134 via an external GGSN 136. The external GGSN 136 provides access to the other PLMN 134 that can be, for example, a wireless telecommunications network operated by another service operator or the same service operator.

The second RAN, illustrated in the lower left hand portion of FIG. 1, is dedicated to UMTS-based network access and is now described. The illustrated wireless telecommunications network 100 also includes a first user equipment (UE) 138 and a second UE 140 that are each in communication with a Node B 142 via the Uu radio (air) interface. A Node B 142 is the terminating node for the radio interface in the second RAN. Each Node B 142 can include one or more transceivers for transmission and reception of data cross the radio interface. Each Node B 142 is configured to apply the codes to describe channels in a CDMA-based UMTS. Generally, the Node B 142 performs similar functions for the UMTS network that the BTS 106 performs for the GSM network.

In the illustrated embodiment, the first UE 138 is a mobile phone and the second UE 140 is a portable computer, such as a laptop with an integrated or external, removable UMTS card. Each UE 138, 140 can include mobile equipment, such as keyboards, screens, radio transceivers, circuit boards, processors, etc., and a SIM/universal SIM (USIM) that contains subscriber information to enable network access to the wireless telecommunications network 100. Generally, the UE's 138, 140 perform similar functions for the UMTS network that the MS's 102, 104 perform for the GSM network.

Each Node B 142 is in communication with a radio network controller (RNC) 144 via the Iub interface. The RNC 144 is configured to allocate radio resources to the UE's 138, 140, administer frequencies, and control handovers between Node B's 142 (and others not shown). Although illustrated as a distinct element, the RNC 144 functions can be located with the Node B's 142. In this embodiment, the Iub interface is eliminated. Generally, the RNC 144 performs similar functions for the UMTS network that the BSC 108 performs for the GSM network.

The RNC 144 is in communication with the MSC 114 via an Iu-CS interface. The RNC 144 is also in communication with the SGSN 112 via an Iu-PS interface. The other network elements perform the same functions for the UMTS network as described above for the GSM network.

Referring now to FIG. 2, an exemplary Internet protocol Multimedia Subsystem (IMS) network 200 in which the present disclosure can be implemented is illustrated. The IMS network 200 includes an IMS core network 202 and a several access networks 204, 206, 208, 210. The IMS core network 202 primarily includes a call session control function (CSCF) 212 and a home subscriber server (HSS) 214 as illustrated, although other elements, not illustrated, are contemplated. The CSCF 212 facilitates session initiation protocol (SIP) session control for SIP session setup and SIP session teardown. The CSCF 212 communicates with the HSS 214. The HSS 214 acts as the master database of subscribers and is configured to function similar to the HLR/AuC 117.

The CSCF 212 can be divided into three logical divisions (not shown) including a proxy-CSCF (P-CSCF), an interrogating-CSCF (I-CSCF), and a serving-CSCF (S-CSCF). The P-CSCF operates as the entry point in the IMS core network 202. The P-CSCF is configured to forward SIP messages received from a device that is in communication with one of the access networks 204, 206, 208, 210. The SIP messages can be sent to the I-CSCF or S-CSCF depending on the type of message and intended action. The P-CSCF is also configured to generate call detail records. The I-CSCF is configured to register, route and forward SIP messages within the IMS core network 202. The S-CSCF is configured to manage device registrations, maintain sessions, interact with other services, perform charging functions, and provide security.

The access networks can include broadband wireless access networks 204, such as wireless local area network (WLAN) and WiMax networks, broadband cable access networks 206, such as cable Internet provider networks, fixed access networks 208, such as the PSTN 122, the ISDN 124, and xDSL networks, and mobile access networks 210, such as GSM/EDGE and 3G networks including the wireless telecommunications network 100, for example.

In the illustrated embodiment, the IMS core network 202 is in communication with a PCPS 126. The PCPS 126 is in communication with several enablers, such as the illustrated application servers 216, 218, 220, 222. The application servers 216, 218, 220, 222 can provide various services and information associated with LBS's, PBS's, calendar services, and address book services (e.g., MICROSOFT® Exchange) as described above, for example. The CSCF 212 can receive a communication via any of the access networks 204, 206, 208, 210 and route the communication to the PCPS 126 for personalized communication processing according to the various methods and details described herein.

FIG. 3 is a schematic block diagram illustrating an exemplary device 300 for use in accordance with an exemplary embodiment of the present disclosure. Although no connections are shown between the components illustrated and described in FIG. 3, the components can interact with each other to carry out device functions.

The device 300 can include any mobile equipment, such as the MS's 102, 104 and UE's 138, 140 that are illustrated in FIG. 1. FIG. 3 and the following description are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 300 can include a display 302 for displaying multimedia such as, for example, text, images, video, telephony functions, such as, caller line ID data, setup functions, menus, music metadata, messages, wallpaper, graphics, and the like. The device 300 can include a processor 304 for controlling, and/or processing data. A memory 306 can interface with the processor 304 for the storage of data and/or applications 308. The memory 306 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 300.

The memory 306 can be configured to store one or more applications 308, such as, for example, positioning applications, LBS applications, presence applications, calendar applications, address book applications, music player applications, video player applications, personalized communication processing applications, combinations thereof, and the like. The applications 308 can also include a user interface (UI) application 310. The UI application 310 can interface with a client 312 (e.g., an operating system) to facilitate user interaction with device functionality and data, for example, answering/initiating calls, entering/deleting data, configuring settings, address book manipulation, multimode interaction, and the like. The applications 308 can include other applications 314 such as, for example, add-ons, plug-ins, voice recognition application, call voice processing applications, voice recording applications, messaging applications, e-mail processing applications, video processing applications, image processing applications, text-to-speech conversion applications, combinations thereof, and the like, as well as subsystems and/or components. The applications 308 can be stored in the memory 306 and/or in a firmware 316, and can be executed by the processor 304. The firmware 316 can also store code for execution during initialization of the device 300.

A communications component 318 can interface with the processor 304 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 318 can also include a multimode communications subsystem for providing cellular communications via different cellular technologies. For example, a first cellular transceiver 320 can operate in one mode, such as GSM, and an Nth transceiver 322 can operate in a different mode, such as WiFi. While only two transceivers 320, 322 are illustrated, it should be appreciated that a plurality of transceivers can be included. The communications component 318 can also include a transceiver 324 for unlicensed RF communications using technology such as, for example, WiFi, WiMax, NFC, other RF and the like. The transceiver 324 can also be configured for line-of-sight technologies, such as, for example, infrared and IRDA. Although a single transceiver 324 is illustrated multiple transceivers for unlicensed RF and line-of-sight technologies are contemplated.

The communications component 318 can also facilitate communications reception from terrestrial radio networks, digital satellite radio networks, Internet-based radio services networks, IMS networks, combinations thereof, and the like. The communications component 318 can process data from a network, such as, for example, the Internet, an intranet, a home broadband network, and the like, via an ISP, DSL provider, or other broadband service provider.

An input/output (I/O) interface 326 can be provided for input/output of data and/or signals. The I/O interface 326 can be a hardwire connection, such as, for example, a USB, PS2, IEEE 1394, serial, parallel, IEEE 802.3 (e.g., Ethernet-RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 328 that can include a speaker (not shown) for the output of audio signals and a microphone (not shown) to collect audio signals.

The device 300 can include a slot interface 330 for accommodating a subscriber identity system 332, such as, for example, a SIM or USIM. The subscriber identity system 332 instead can be manufactured into the device 300, thereby obviating the need for a slot interface 330.

The device 300 can include an image capture and processing system 334. Photos and/or videos can be obtained via an associated image capture subsystem of the image system 334, for example, a camera. The device 300 can also include a video systems component 336 for processing, recording, and/or transmitting video content.

A location component 338 can be included to send and/or receive signals, such as, for example, GPS data, A-GPS data, triangulation data, combinations thereof, and the like. The device 300 can use the received data to identify its location or can transmit data used by other devices and location enablers to determine the device 300 location.

The device 300 can include a power source 340 such as batteries and/or other power subsystem (AC or DC). The power source 340 can be single-use, continuous, or rechargeable. In the case of the latter, the power source 340 can interface with an external power system or charging equipment via a power I/O component 342.

The device 300 also includes a PCPS 126. The PCPS 126 can be configured as hardware, software, or any combination thereof. The PCPS 126 can provide device-based personalized communication processing instead of network-based personalized communication processing as described in the embodiments illustrated in FIG. 1 and FIG. 2. The PCPS 126 and methods of operating the PCPS 126 are described in greater detail with reference to FIGS. 4-9.

Figure 4:
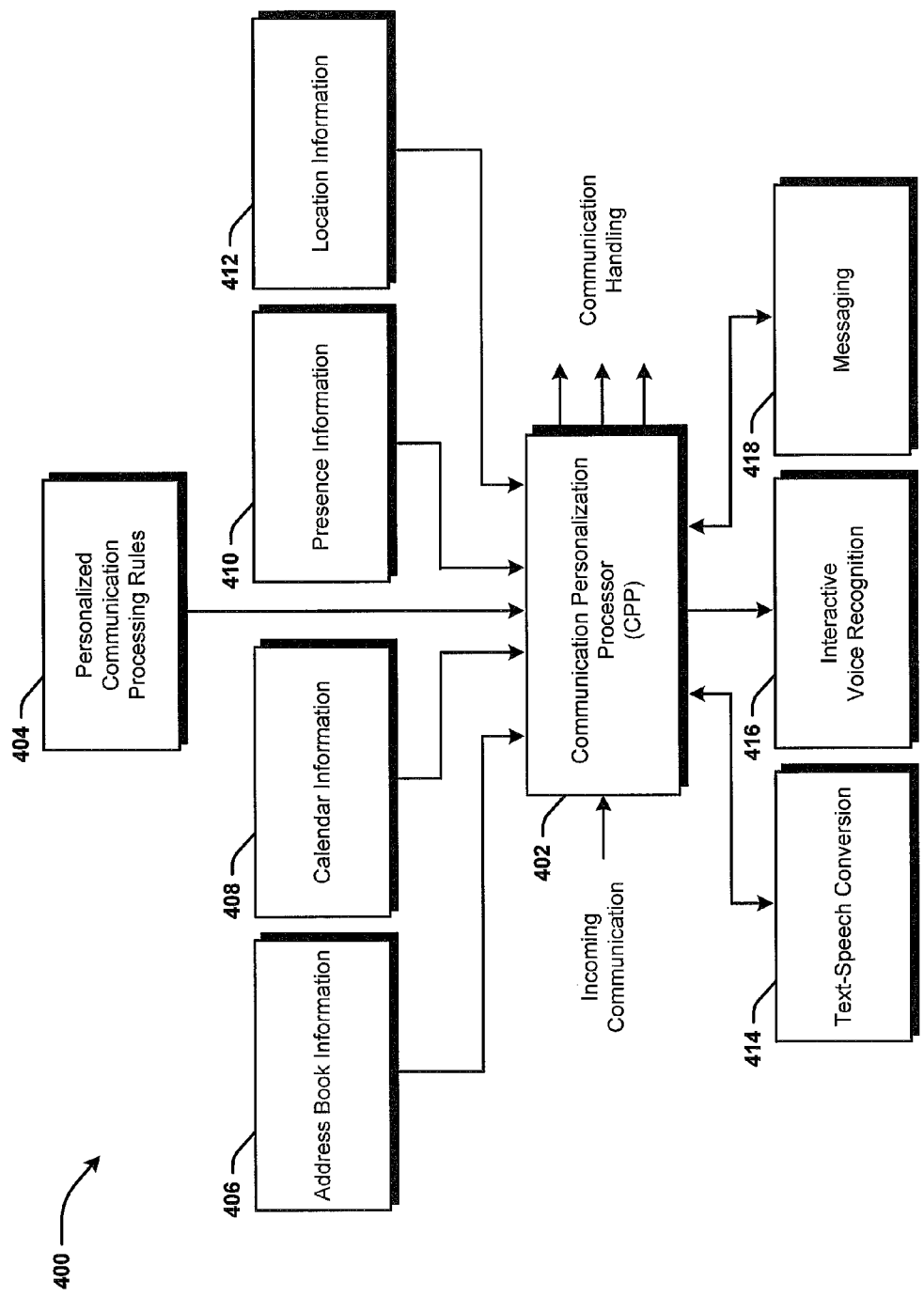
FIG. 4 is a system architecture of a personalized communication processing system, according to an exemplary embodiment of the present disclosure.

Referring now to FIG. 4, a system architecture 400 for a personalized communication processing system, such as PCPS 126, is illustrated, according to an exemplary embodiment of the present disclosure. The CPP 402 can be configured to use personalized communication processing rules 404

(sometimes referred to herein as "rules") and information, such as, but not limited to, address book information 406, calendar information 408, presence information 410, and location information 412 from a variety of enablers to provide a flexible personalized communication processing service. The CPP 402 can also utilize a text-to-speech conversion 414, interactive voice recognition 416, and messaging 418 to process incoming communications according to the rules 404.

Figure 5:
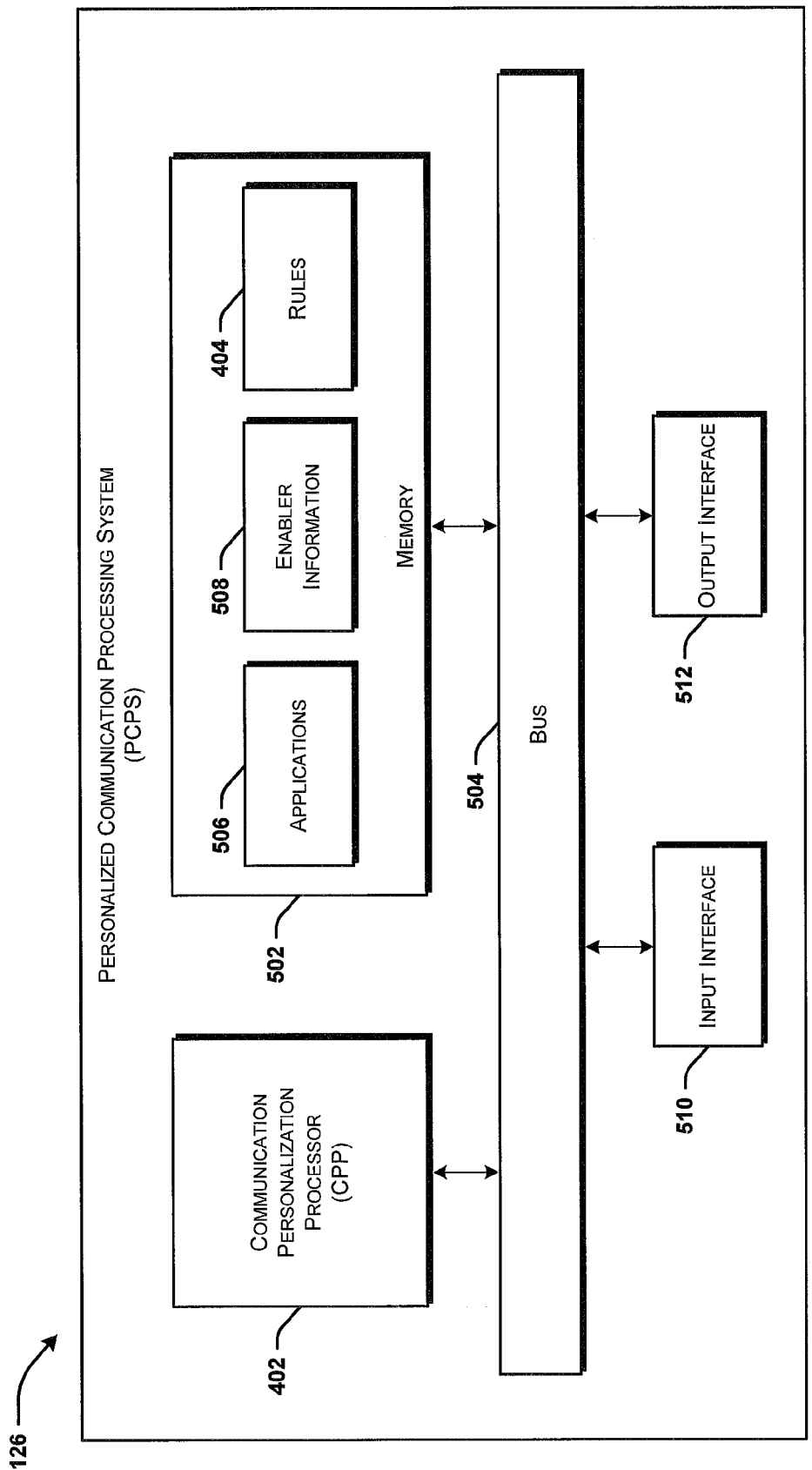
FIG. 5 illustrates a personalized communication processing system and components thereof, according to an exemplary embodiment of the present disclosure.

FIG. 5 is a schematic block diagram illustrating an exemplary PCPS 126 for use in accordance with an exemplary embodiment of the present disclosure. The illustrated PCPS 126 includes one or more CPP's 402 that is operatively linked and in communication with one or more memory modules 502 via one or more data/memory busses 504. It should be appreciated that the PCPS 126 can reside on a mobile device, for example, a laptop computer, a palmtop computer, a mobile telephone, a mobile station, a user equipment, or a network element, combinations thereof, and the like. It should be further appreciated that the PCPS 126 can reside in or be logically associated with a network element or a network node in a wireless telecommunications network or a fixed telecommunications network, for example.

The word "memory," as used herein to describe the memory module 502, collectively includes all memory types associated with the PCPS 126 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory module 502 is illustrated as residing proximate the CPP 402, it should be understood that the memory module 502 can be a remotely accessed storage system, for example, a remote hard disk drive, a removable storage medium, combinations thereof, and the like. The illustrated memory module 502 can include one or more applications 506, enabler information 508, and rules 404.

The applications 506 can include programs, routines, subroutines, algorithms, software, tools, and the like. For example, the applications 506 can include a user interface application for allowing a user to define communication treatments to be applied depending upon the relationship between the user and the contacting party, the user's current state, and the user's preferences. The user interface application can enable the user to specify components that contribute to the creation of rules 404. Exemplary rules 404 and components are described in FIG. 6.

The PCPS 126 can also include an input interface 510 and an output interface 512, each operatively linked and in communication with the data/memory bus 504. The input interface 510 can be configured to receive incoming communications, such as calls, SMS messages, multimedia messages, email messages, video messages, video calls, video share requests, chat requests, any combination thereof, and the like. The output interface 512 can be configured to output communication according to personalized communication processing treatment as determined by the PCPS 126. Communication processing can include, but is not limited to, routing calls to voicemail, providing response options to the calling party, providing the called party with personalized notifications based upon the calling party, placing the calling party on hold, routing calls to other destinations (call forwarding), and performing alternative communications.

Figure 6:
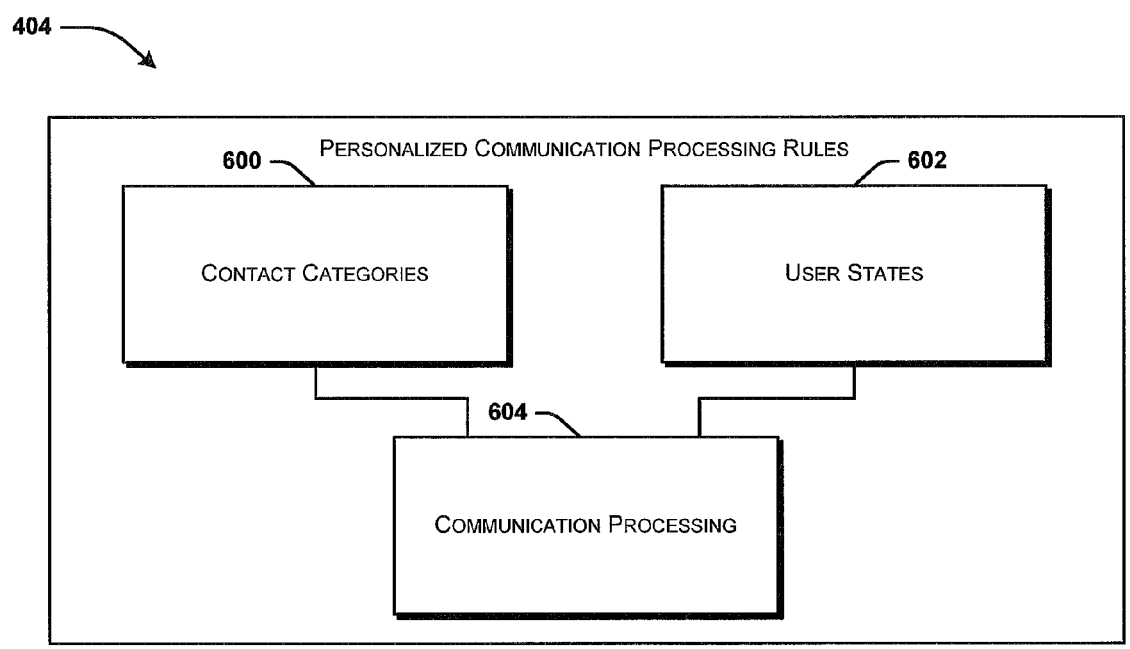
FIG. 6 is a hierarchical view of personalization rules used by the personalized communication processing system to provide a personalized communication processing service, according to an exemplary embodiment of the present disclosure.

Referring now to FIG. 6, a hierarchical view of personalization rules 404 used by the PCPS 126 to provide a personalized communication processing service is illustrated, according to an exemplary embodiment of the present disclosure. A user, a network operator, an application provider, a service provider, or another entity can define the rules 404, for example. By way of example and not limitation, the rules 404 can enable a user to specify different communication treatments to be applied to an incoming communication based upon the relationship between the user and the contacting party, the user's current state, and the user's preferences. A user interface can enable the user to specify each component of a rule and to perceive potentially complex relationships between the components. FIG. 6 provides an overview of an exemplary set of personalization rule components.

As illustrated, the personalized communication processing rules 404 can include a contact categories component 600, a user states component 602, and a communication processing component 604. The contact categories component 600 can define the relationship between the user and the calling party. The contact categories component 600 can provide a basis for associating different personalized communication treatments with incoming communications. The user can define contact categories and one or more members of a contact category. Members of a contact category can be identified using any of the descriptors found in a user's address book, such as, for example, contact names, business names, telephone numbers, physical addresses, email addresses, website URLs, and other fields. Wild cards and logical expressions can be used to specify groups of members in category. Contacts can belong to more than one category.

A guided menu can be used to guide the user through the process of establishing contact categories and members, for example, by using existing address book and/or call log information (e.g., frequently called numbers or favorites). Several exemplary non-limiting contact categories are described below:

| Example Contact Categories: |
| --- |
| Wife: AddressBookName = Jane Doe |
| Family: AddressBookName = *Doe |
| Supervisor: AddressBookName = Bob Sanders |
| Colleague: AddressBookEmail = *@att.com |
| Pest: CallingPartyID = 800* OR CallingPartyID = Unknown |
| Friend: AddressBookName = Billy Ray OR |
| AddressBookName = Jill Smith OR |
| AddressBookEmail = Cynthia@email.com |

The user states component 602 can identify conditions under which different communication processing is provided for communication categories. New or existing calendar functionality can be used to identify a user's user state at any given time. Alternatively, presence information provided by a presence client can identify a user's user state.

The communication processing component 604 can enable the user to define personalized communication processing for various communication types under different user states. For each user state, different communication processing can be defined for each of the contact categories described above. Different user states can be defined by the user. A default user state, for example, normal can also be defined. It should be understood that the communication processing provided can vary as a function of dynamically variable information available from various enablers.

The user interface from which the logic for communication processing is generated could be provided through a guided menu that guides the user through the process of establishing communication processing descriptions. A visual programming tool can be offered for advanced users.

An exemplary example of communication processing for a given user state is explained below by the following illustrative pseudo code:

```
UserState: Normal /* e.g., default user state */
    IF Category = Family THEN
    IF HomePhonePresence = Available THEN RouteTo HomePhone END
    IF OfficePhonePresence = Available THEN RouteTo OfficePhone END
    IF CellPhonePresence = Available THEN RouteTo CellPhone END
ELSE IF Category = Supervisor THEN
      IF OfficePhonePresence = Available THEN RouteTo OfficePhone END
      IF HomePhonePresence = Available THEN RouteTo HomePhone END
ELSE IF Category = Colleague THEN
        IF OfficePhonePresence = Available THEN RouteTo OfficePhone END
ELSE IF Category = Pest THEN
    Announce "I'm not receiving Unknown calls at this time" END
ELSE
    BEGIN
        Announce "I'm not available at the moment, press 1 to leave a message"
        Get Input
        IF Input = 1 THEN route to VoiceMail
    END
END
UserState: InMeeting /* user is in a meeting */
    IF Category = Wife OR Son OR Supervisor THEN
        BEGIN
            Announce
                "Hi, I'm in a meeting.
                Say Interrupt to interrupt me if its an Emergency,
                Say SMS to SMS me,
                Say Callback for me to call you back when I'm available,
                Say Voicemail to leave a voicemail"
            Get VoiceInput Interrupt SMS Callback Voicemail
                IF VoiceInput = Interrupt THEN RouteTo CellPhone
                IF VoiceInput = SMS THEN SMSProcessing
                IF VoiceInput = Callback THEN CallbackWhen Available
                IF VoiceInput = Voicemail THEN RouteTo VoiceMail
        END
    ELSE RouteTo VoiceMail
    END
```

Figure 7:
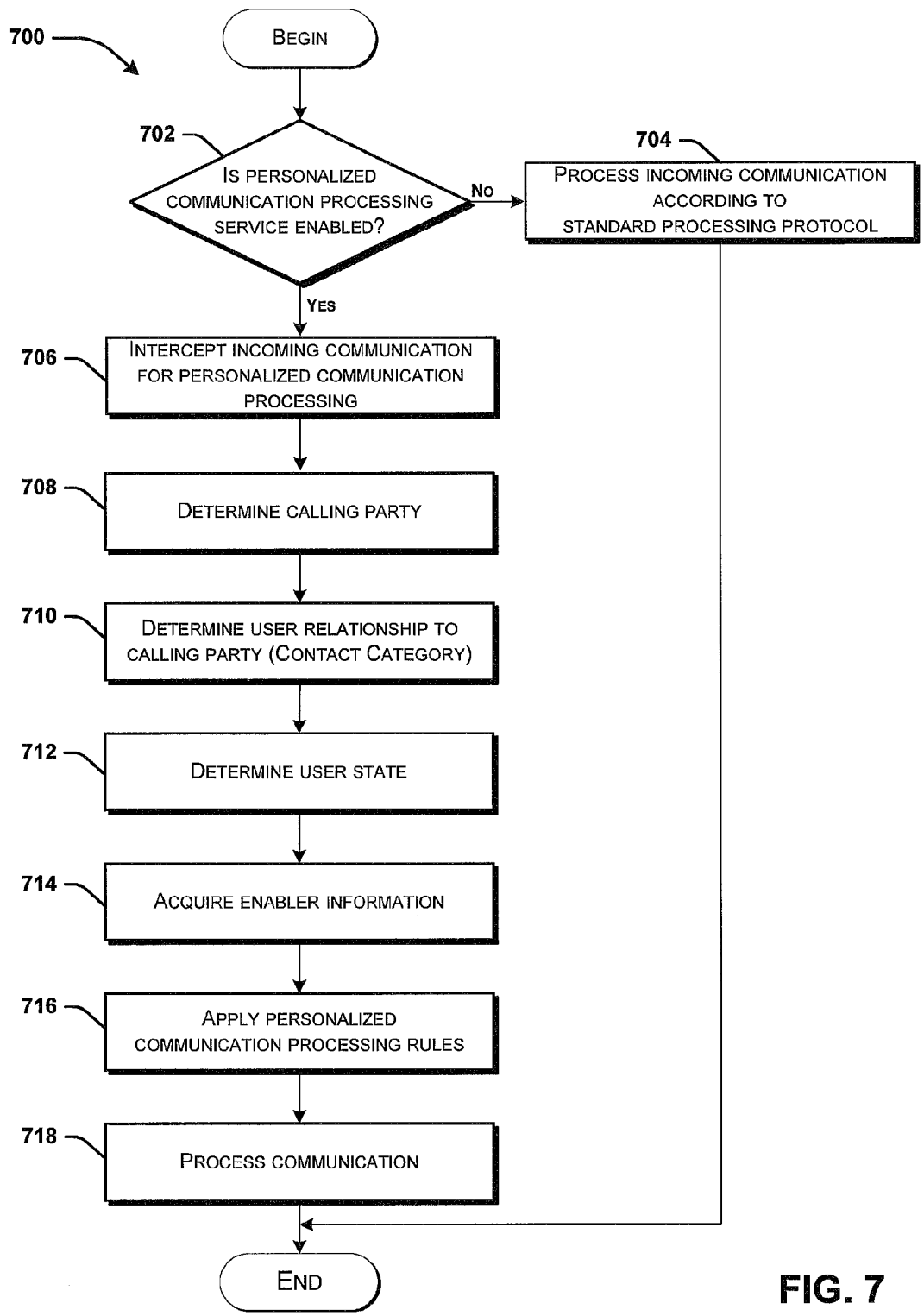
FIG. 7 illustrates a method for operating a personalized communication processing system, according to an exemplary embodiment of the present disclosure.

Referring now to FIG. 7, a method 700 for operating a PCPS 126 is illustrated, according to an exemplary embodiment of the present disclosure. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. Some or all steps of this process, and/or substantially equivalent steps, can be performed by execution of computer-readable instructions included on a computer readable medium.

The illustrated method 700 begins and flow proceeds to block 702 wherein a determination is made as to whether the personalized communication processing service is enabled for the called party. For example, the called party can enable or disable the personalized communication processing service via a mobile device interface, an interactive voice response (IVR) system interface, a web page interface, or other interface.

If it is determined, at block 702, that the personalized communication processing service is not enabled, the method 700 proceeds to block 704. At block 704, an incoming communication is processed according to standard processing protocols for the incoming communication type. For example, the MSC 114 or CSCF 212 can process the communication according to known protocols as defined by technology specifications for GSM, UMTS, IMS, SMS, and/or other technologies. The method 700 can end.

If it is determined, at block 702, that the personalized communication processing service is enabled, the method 700 proceeds to block 706. At block 706, the PCPS 126 can intercept an incoming communication. In some embodiments, the PCPS 126 can intercept the incoming communication at the MSC 114 prior to the MSC 114 processing the incoming communication. In other embodiments, the PCPS 126 can intercept the incoming communication at the CSCF 212. In still other embodiments, the PCPS 126 can intercept the incoming communication at a mobile device, such as the mobile device 300 after the communication is routed to the mobile device. By enabling the personalized communication processing service, the PCPS 126 can be alerted to monitor incoming communications directed to the called party and intercept the incoming communication for processing according to the remaining blocks of the method 700, as will now be described.

At block 708, the PCPS 126 can determine the calling party, for example, based upon calling party identification information. At block 710, the PCPS 126 can determine the called party's relationship to the calling party, for example, the contact category to which the calling party belongs. The PCPS 126 can determine the user state at block 712. The pseudo code described above provides a few exemplary examples of how the PCPS 126 can determine the user state. At block 714, the PCPS 126 can acquire enabler information from one or more enablers. It should be understood that in some embodiments no enabler information is acquired and the method 700 proceeds to block 716. At block 716, the PCPS 126 can apply the personalized communication processing rules 404. At block 718, the PCPS 126 can process the incoming communication according to the rules 404. In some embodiments, the PCPS 126 instructs the MSC 114, the CSCF 212, the mobile device 300, or other element how to process the incoming communication according to the rules 404. The method 700 can end.

Figure 8:
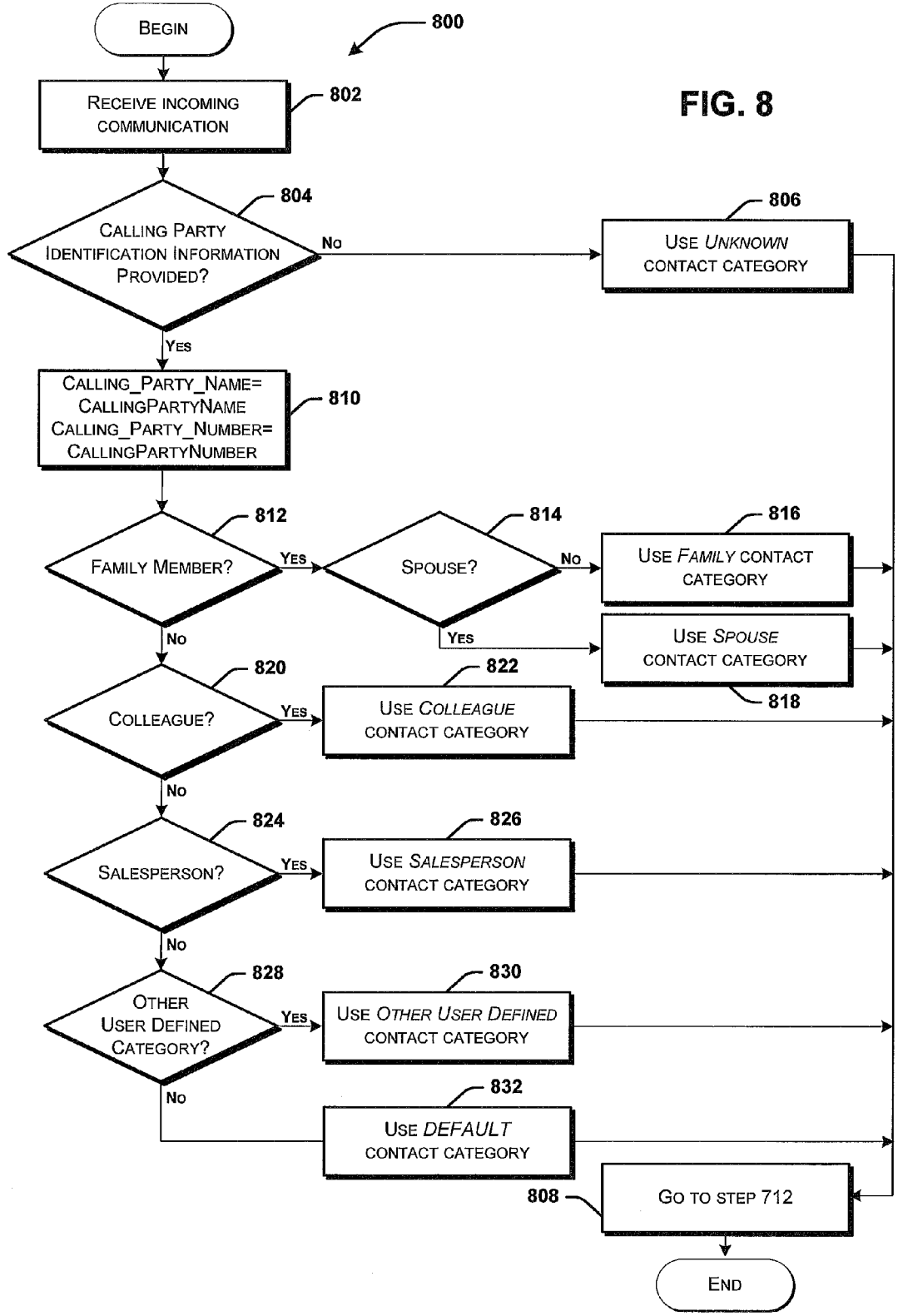
FIG. 8 illustrates a method for operating a personalized communication processing system, according to another exemplary embodiment of the present disclosure.

Referring now to FIG. 8, a method 800 for operating a PCPS 126 is illustrated, according to another exemplary embodiment of the present disclosure. It should be understood that the steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. In addition, the contact categories presented are for illustrative purposes only; more, less, or other contact categories are contemplated. The method 800 illustrates one non-limiting example of user-defined contact categories. It should also be understood that the illustrated method 800 can be ended at any time. Some or all steps of this process, and/or substantially equivalent steps, can be performed by execution of computer-readable instructions included on a computer readable medium.

The method 800 begins and flow proceeds to block 802 wherein the PCPS 126 receives an incoming communication. At block 804, the PCPS 126 determines if calling party ID information is provided with the incoming communication. If no calling party ID information is provided, for example, a telephone number is withheld by the calling party, flow proceeds to block 806 wherein the PCPS 126 defaults to use an UNKNOWN contact category. Flow can then proceed to block 808 wherein the PCPS 126 reverts to block 712 of FIG. 7. The PCPS 126 can perform the remainder of the method 700 and the method 800 can end.

If the PCPS 126 determines that calling party information is provided, at block 804, the method 800 can proceed to block 810 wherein the calling party information, for example, the calling party name and/or the calling party number, can be associated with an alias used by the PCPS 126 to compare the calling party information to all available contact categories. In the illustrated, non-limiting example, contact categories for family members, colleagues, salespersons or pests, and other user defined contact categories are defined. Calling party information can be assigned to a contact category. The present disclosure is not limited to these exemplary contact category examples.

At bock 812, the PCPS 126 determines whether the incoming communication is from a calling party that is a member of the FAMILY contact category. If the PCPS 126 determines that the incoming communication is from a calling party that is a member of the FAMILY contact category, flow can proceed to block 816 wherein the PCPS 126 determines if the calling party is a spouse of the called party. If the calling party is not a spouse, the PCPS 126 can determine to use the FAMILY contact category as illustrated in block 816. Otherwise, if the calling party is a spouse, the PCPS 126 can determine to use the SPOUSE contact category as illustrated in block 816. In either case, flow can proceed to block 808 wherein the method 800 reverts to block 712. The PCPS 126 can perform the remainder of the method 700 and the method 800 can end.

If the PCPS 126 determines that the calling party is not a family member, flow can proceed to block 820 wherein the PCPS 126 determines whether the incoming communication is from a calling party that is a member of the COLLEAGUE contact category. If the PCPS 126 determines that the incoming communication is from a calling party that is a member of the COLLEAGUE contact category, flow proceeds to block 822 and then to block 808 wherein the method 800 reverts to block 712. The PCPS 126 can perform the remainder of the method 700 and the method 800 can end. If the PCPS 126 determines that the incoming communication is from a calling party that is not a member of the COLLEAGUE contact category, flow proceeds to block 824.

At block 824 the PCPS 126 can determine if the incoming communication is from a calling party that is a member of a SALESPERSON contact category. If the PCPS 126 determines that the incoming communication is from a calling party that is a member of the SALESPERSON contact category, flow proceeds to block 826 and then to block 808 wherein the method 800 reverts to block 712. The PCPS 126 can perform the remainder to the method 700 and the method 800 can end. If the PCPS 126 determines that the incoming communication is from a calling party that is not a member of the SALESPERSON contact category, flow proceeds to block 828.

At block 828 the PCPS 126 can determine if the incoming communication is from a calling party that is a member of an OTHER USER DEFINED contact category. If the PCPS 126 determines that the incoming communication is from a calling party that is a member of the OTHER USER DEFINED contact category, flow proceeds to block 830 and then to block 808 wherein the method 800 reverts to block 712. The PCPS 126 can perform the remainder of the method 700 and the method 800 can end. If the PCPS 126 determines that the incoming communication is from a calling party that is not a member of the OTHER USER DEFINED contact category, flow proceeds to block 808 wherein the method 800 reverts to block 712. The PCPS 126 can perform the remainder of the method 700 and the method 800 can end.

In some embodiments, calling party information is known but cannot be assigned to any contact category. In these embodiments a DEFAULT contact category for known but not categorized contact information can be used, as illustrated in block 832, and a default communication treatment can be applied.

Figure 9:
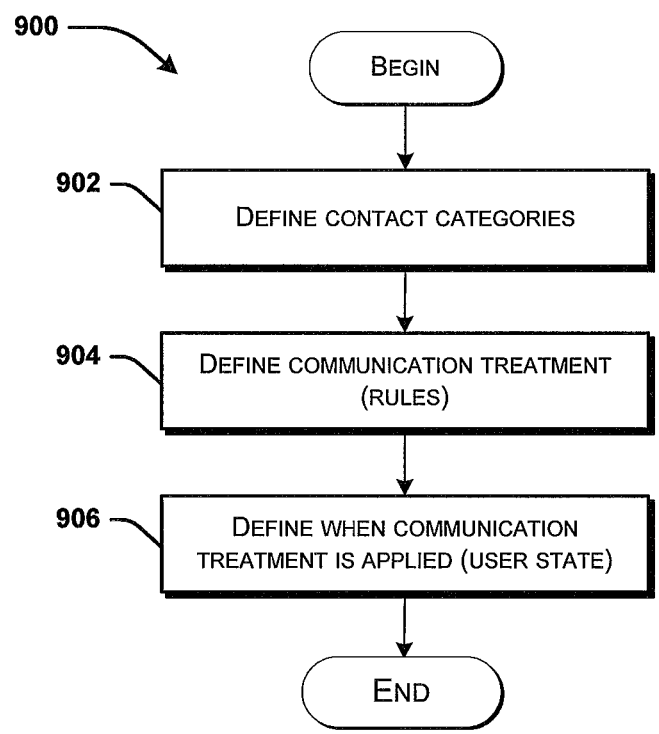
FIG. 9 illustrates a method for operating a personalized communication processing system, according to another exemplary embodiment of the present disclosure.

Referring now to FIG. 9, a method 900 for operating a PCPS 126 is illustrated, according to exemplary embodiment of the present disclosure. It should be understood that the steps of the method 900 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 900 can be ended at any time. Some or all steps of this process, and/or substantially equivalent steps, can be performed by execution of computer-readable instructions included on a computer readable medium.

Initialization of the personalized communication processing service can invoke the illustrated method 900. Additionally or alternatively, the method 900 can be invoked at any time to define, redefine, modify, delete, or otherwise manage and personalize contact categories, rules, and/or user states. The method 900 can be invoked by a user via the mobile device interface, an IVR interface, a web page interface, or any other interface. Alternatively, the method 900 can be invoked by a network operator, an application provider, a service provider, or other entity.

The method 900 begins and flow proceeds to block 902 wherein a user of the PCPS 126 can define one or more contact categories, for example, via a user interface. At block 904, the user can define communication treatment via one or more rules, for example, via a user interface. At block 906, the user can define when communication treatment is applied, for example, via a user interface. The method 900 can end. In an alternative embodiment, the PCPS 126 can perform the steps of method 900 to dynamically and automatically define contact categories, define communication treatment rules, and determine when communication treatment rules are applied. Accordingly, the PCPS 126 can utilize contact categories, user states, and rules previously defined by a user and/or other information to determine applicable communication treatment. The PCPS 126 can be configured to recognize trends, for example, in user-defined contact categories, rules, and user states to define new or modify existing contact categories.

The present disclosure can be further described through several exemplary use cases provided below. It should be understood that the following use cases are exemplary only and do not seek to define or limit the present disclosure. For ease of description, several fictional persons are portrayed including "Joe" as the main user and "Jane," Joe's wife. "Joe" has customized his account in the PCPS 126 to use a virtual secretary, named "Deja."

Use Case 1—Personalized Calling Party Notification

Example A: Joe is at his office desk, reading a document. Jane calls him and the PCPS 126 recognizes Joe's wife is calling (e.g., calling party ID information, contact information), and that Joe is available (e.g., presence information). A unique personalized announcement of the incoming call can be provided, "Joe, your wife is calling." Joe can decide whether to answer the incoming call. In this exemplary use case, the caller's relationship to the user is recognized and the user is provided with a personalized notification announcement based upon the rules Joe defined for incoming communications from his wife.

Example B: An unsolicited salesman calls Joe. The communication is recognized as a potentially undesirable instrusion (e.g., unrecognized toll-free number). A tone is provided to inform Joe that a call has arrived and the call is routed to Joe's voicemail box. In this exemplary use case, the incoming call is recognized as potentially undesirable and personalized notification and routing is provided based upon the rules Joe defined for undesirable calls.

Use Case 2—Personalized 'in Meeting' Call Processing

Example A: Joe is in a meeting at work and Jane calls Joe at his office number. The PCPS 126 recognizes that the calling party is Joe's wife, that Joe is in a meeting, and that Joe is not available (e.g., calendar information and presence information). A personalized interactive voice recognition dialog is provided. For example: "Hello, this is Deja, Joe's virtual secretary. Joe is in a meeting scheduled to last until 3:00. Would you like me to get him for you? Please say yes or no." Jane says "Yes." The "yes" response is recognized and Jane is informed, "Please hold while I get him." An SMS message is sent to Joe's mobile phone, "Jane is on the phone." Joe's phone receives the SMS message and sees his wife is trying to reach him. Joe quietly steps out of the meeting and picks up the call on his mobile phone. In this exemplary use case, the caller's relationship to the user is recognized. A unique customized interactive voice recognition treatment, multimedia interworking, user notification, and call processing are provided based upon the rules Joe defined for instances wherein Joe is in a meeting and his wife calls.

Example B: A colleague calls Joe at his office number. The PCPS 126 recognizes that the calling party is a colleague, that Joe is in a meeting, and that Joe is not available (e.g., calling party ID, calendar, presence information). The call is answered and a personalized informative announcement is provided. For example, "Hello, this is Deja, Joe's virtual secretary. Joe is in a meeting in Room 720 that is scheduled to last until 3:00. Would you like to leave a message? Please say yes or no." Joe's colleague decides to simply go see Joe in Room 720, Joe's colleague says "no," hangs up, and the call is disconnected. In this exemplary use case, the caller's relationship to the user is recognized and a personalized informative interactive voice recognition treatment is provided based upon the rules Joe defined for instances wherein Joe is in a meeting and a colleague calls.

Use Case 3—Personalized 'Out of Office' Call Processing

Example A: Joe is on vacation in a foreign country that is six time zones earlier than his home and business location. A colleague calls Joe. The PCPS 126 recognizes that the calling party is a colleague, that Joe is on vacation and that Joe is not available (e.g., calling party ID, contact, calendar, and presence information). The call is answered and a personalized interactive voice recognition dialog provided. For example, "Hello, this is Deja, Joe's Virtual Secretary. Joe is on vacation and unavailable until December $1^{st}$. Would you like to speak to his Executive Director? Please say yes or no." The colleague has urgent questions regarding the status of a project so he says "yes." The PCPS 126 recognizes the response and further information is provided to the calling party. "One moment please while I forward your call." The call is then forwarded to Joe's Executive Director. In this exemplary use case, the caller's relationship to the user is recognized, the user's availability, location, and calendar information are taken into consideration, a personalized interactive voice recognition treatment is applied, and corresponding personalized call routing is provided based upon the rules Joe defined for out of office call processing for colleagues.

Example B: A friend, Garry, calls to see if Joe would like to play golf this weekend. The PCPS 126 recognizes that the calling party is a friend and that Joe is on vacation in a different time zone (e.g., contact list, calling party ID, and calendar information). The call is answered and a personalized interactive voice recognition dialog provided. For example, "Hello, this is Deja, Joe's Virtual Secretary. Joe is out of the country on vacation, and won't be back for eleven days. He can be reached at 011 385 72 19 85, but it's now 2:00 AM at his location. Would you like to leave a voice mail message? Please say yes or no." Garry says "yes" and leaves a voicemail message for Joe. After he leaves the voice mail message, Garry is asked "Garry, would you like me to send an SMS to notify Joe you called and left a message? Please say yes or no." Garry says "yes" and an SMS message is sent to Joe's phone indicating "Garry called at 8:00 PM and left a message in your voicemail box." In this exemplary use case, the caller's relationship to the user is recognized, the user's availability, location, and calendar information are taken into consideration, and an informative personalized interactive voice recognition treatment is applied along with multimedia processing and routing based upon the rules defined for out of office processing for friends.

Use Case 4—Personal Reminders

Joe has an 8:00 AM dentist appointment. The time is 7:00 AM and Joe is at home and about to leave for the office. The PCPS 126 recognizes that Joe has an 8:00 AM dentist appointment and that Joe is at home (e.g., calendar and location information). Joe is automatically called on his phone and informed "Good Morning Joe, this is Deja. Please don't forget! You have an appointment with the dentist at 8:00 AM and you have a meeting in room 710 with Bill Smith at 10:30 AM. Do be careful while driving and have a great day. Goodbye!" In this exemplary use case, Joe's current location, pending appointments and meetings (e.g., calendar information) are recognized. Joe is provided with a personalized timely verbal reminder in a personalized voice (e.g., content, inflection, tone) based upon the rules Joe defined for personal reminders.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for providing a personalized communication processing service, comprising:
   intercepting, by a personalized communications processing system comprising a processor, incoming communications comprising a voice call, a text message, a multimedia message, an email message, a video message, a video call, an instant message, a chat request, and a video share request;
   acquiring, from an enabler source, enabler information of a contacted party, the enabler information comprising presence information, location information, calendar information, and address book information;
   identifying, by the personalized communications processing system, if available, contacting-party information associated with a particular intercepted incoming communication, of the intercepted incoming communications, the contacting-party information comprising a contacting-party number and a contacting-party name;
   determining, by the personalized communications processing system, a general contacted-party-specified contact category to which a contacting party is logically associated based upon a recognized relationship between the contacted party and the contacting party as defined in the general contacted-party-specified contact category;
   determining, by the personalized communications processing system, in response to determining the general contacted-party-specified contact category to which the contacting party is logically associated, a specific contacted-party-specified contact category to which the contacting party is logically associated, the specific contacted-party-specified contact category being a subset of the general contacted-party-specified contact category and requiring that the contacting party be a spouse, child, or supervisor;
   determining, by the personalized communications processing system, a contacted-party state;
   identifying a personalized communication processing rule associated with the determined contacted-party state and the specific contacted-party-specified contact category to which the contacting party is logically associated;
   processing, by the personalized communications processing system, the particular intercepted incoming communication according to the personalized communication processing rule associated with the determined contacted-party state and the specific contacted-party-specified contact category, comprising:
   a. providing an announcement to the contacting party;
   b. providing communication-handling options to the contacting party;
   c. receiving, from the contacting party, a communication-handling response indicating one of the communication-handling option provided; and
   d. routing the particular intercepted incoming communication according to the communication-handling response received from the contacting party;
   wherein the communication-handling option include:
   i. an option to interrupt the contacted party by routing the particular intercepted incoming communication directly to a specified device associated with the contacted party;
   ii. an option to route the contacting party to a short message service for delivery to the contacted party;
   iii. an option to provide the contacted party with a request to callback the contacting party; and
   iv. an option to route the particular intercepted incoming communication to a voicemail account associated with the contacted party; and
   processing, if it is determined that no contacting party information is available, the particular intercepted incoming communication according to a default rule.

2. The method of claim 1, wherein:
   the personalized communications processing system is logically associated with a mobile switching center; and
   intercepting the particular incoming communication from the contacting party comprises intercepting the particular incoming communication at the mobile switching center.

3. The method of claim 1, wherein:
   the personalized communications processing system is logically associated with a call session control function; and
   intercepting the particular incoming communication from the contacting party comprises intercepting the particular incoming communication at the call session control function.

4. A personalized communication processing system, comprising:
   a processor configured to receive incoming communications; and
   a memory operatively linked to the processor and comprising computer-executable instructions, that when executed by the processor, cause the processor to perform operations, comprising:
   intercepting the incoming communications comprising a voice call, a text message, a multimedia message, an email message, a video message, a video call, an instant message, a chat request, and a video share request;
   acquiring, from an enabler source, enabler information of a contacted party, the enabler information comprising presence information, location information, calendar information, and address book information;
   identifying, if available, contacting-party information associated with a particular intercepted incoming communication, of the intercepted incoming communications, the contacting-party information comprising a contacting-party number and a contacting-party name;
   determining a general contacted-party-specified contact category to which a contacting party is logically associated based upon a recognized relationship between the contacted party and the contacting party as defined in the general contacted-party-specified contact category;
   determining, in response to determining the general contacted-party-specified contact category to which the contacting party is logically associated, a specific contacted-party-specified contact category to which the contacting party is logically associated, the specific contacted-party-specified contact category being a subset of the general contacted-party-specified contact category and requiring that the contacting party be a spouse, child, or supervisor;

determining a contacted-party state;

identifying a personalized communication processing rule associated with the determined contacted-party state and the specific contacted-party-specified contact category to which the contacting party is logically associated;

processing the particular intercepted incoming communication according to the personalized communication processing rule associated with the determined contacted-party state and the specific contacted-party-specified contact category, comprising:
  a. providing an announcement to the contacting party;
  b. providing communication-handling options to the contacting party;
  c. receiving, from the contacting party, a communication-handling response indicating one of the communication-handling option provided; and
  d. routing the particular intercepted incoming communication according to the communication-handling response received from the contacting party;

wherein the communication-handling option include:
  i. an option to interrupt the contacted party by routing the particular intercepted incoming communication directly to a specified device associated with the contacted party;
  ii. an option to route the contacting party to a short message service for delivery to the contacted party;
  iii. an option to provide the contacted party with a request to callback the contacting party; and
  iv. an option to route the particular intercepted incoming communication to a voicemail account associated with the contacted party; and processing, if it is determined that no contacting party information is available, the particular intercepted incoming communication according to a default rule.

5. The personalized communication processing system of claim 4, wherein the personalized communication processing system is a network element.

6. The personalized communication processing system of claim 4, wherein the personalized communication processing system is logically associated with a mobile switching center.

7. The personalized communication processing system of claim 6, wherein the operation of intercepting the incoming communication from the contacting party is performed at the mobile switching center.

8. The personalized communication processing system of claim 4, wherein the personalized communication processing system is logically associated with a call session control function.

9. The personalized communication processing system of claim 8, wherein the operations of intercepting the incoming communications from the contacting party is performed at a call session control function.

10. The personalized communication processing system of claim 4, wherein the personalized communication processing system is resident on a mobile device.

11. A computer-readable storage device comprising computer-executable instructions that, when executed by a processor, cause the processor to perform operations comprising:
intercepting the incoming communications comprising a voice call, a text message, a multimedia message, an email message, a video message, a video call, an instant message, a chat request, and a video share request;

acquiring, from an enabler source, enabler information of a contacted party, the enabler information comprising presence information, location information, calendar information, and address book information;

identifying, if available, contacting-party information associated with a particular intercepted incoming communication, of the intercepted incoming communications, the contacting-party information comprising a contacting-party number and a contacting-party name;

determining a general contacted-party-specified contact category to which a contacting party is logically associated based upon a recognized relationship between the contacted party and the contacting party as defined in the general contacted-party-specified contact category;

determining, in response to determining the general contacted-party-specified contact category to which the contacting party is logically associated, a specific contacted-party-specified contact category to which the contacting party is logically associated, the specific contacted-party-specified contact category being a subset of the general contacted-party-specified contact category and requiring that the contacting party be a spouse, child, or supervisor;

determining a contacted-party state;

identifying a personalized communication processing rule associated with the determined contacted-party state and the specific contacted-party-specified contact category to which the contacting party is logically associated;

processing the particular intercepted incoming communication according to the personalized communication processing rule associated with the determined contacted-party state and the specific contacted-party-specified contact category, comprising:
  a. providing an announcement to the contacting party;
  b. providing communication-handling options to the contacting party;
  c. receiving, from the contacting party, a communication-handling response indicating one of the communication-handling option provided; and
  d. routing the particular intercepted incoming communication according to the communication-handling response received from the contacting party;

wherein the communication-handling option include:
  i. an option to interrupt the contacted party by routing the particular intercepted incoming communication directly to a specified device associated with the contacted party;
  ii. an option to route the contacting party to a short message service for delivery to the contacted party;
  iii. an option to provide the contacted party with a request to callback the contacting party; and
  iv. an option to route the particular intercepted incoming communication to a voicemail account associated with the contacted party; and processing, if it is determined that no contacting party information is available, the particular intercepted incoming communication according to a default rule.

12. The computer-readable storage device of claim 11, wherein:
the computer-readable storage device is logically associated with a mobile switching center; and
the operation of intercepting the particular intercepted incoming communication from the contacting party is performed at the mobile switching center.

13. The computer-readable storage device of claim 11, wherein:

the computer-readable storage device is logically associated with a call session control function; and the operation of intercepting the particular intercepted incoming communication from the contacting party is performed at the call session control function.

* * * * *